US007023883B1

(12) United States Patent
Lui et al.

(10) Patent No.: US 7,023,883 B1
(45) Date of Patent: Apr. 4, 2006

(54) METHOD FOR PROVIDING A NETWORK TIMING REFERENCE CLOCK IN ETHERNET-CONNECTED VOIP EQUIPMENT

(75) Inventors: Albert S. Lui, Cupertino, CA (US); David Haidong Fu, San Jose, CA (US); Uzoma Anozie, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 856 days.

(21) Appl. No.: 09/752,608

(22) Filed: Dec. 27, 2000

(51) Int. Cl.
*H04J 3/06* (2006.01)

(52) U.S. Cl. .................................................... 370/503

(58) Field of Classification Search ................ 370/503, 370/507, 509; 375/358, 371
See application file for complete search history.

(56) References Cited

U.S. PATENT DOCUMENTS 5,715,285 A * 2/1998 Yamada ...................... 375/376
5,896,427 A * 4/1999 Muntz et al. ............... 375/372
6,104,729 A * 8/2000 Hellum et al. .............. 370/503
6,175,872 B1 * 1/2001 Neumann et al. ........... 709/231
6,199,170 B1 * 3/2001 Dietrich ...................... 713/400
6,363,073 B1 * 3/2002 Nichols ................ 370/395.62
6,574,225 B1 * 6/2003 Reynolds et al. ...... 370/395.62
6,629,249 B1 * 9/2003 Gonzalez .................... 713/400
6,639,957 B1 * 10/2003 Cahill-O'Brien et al. ... 375/354
6,721,328 B1 * 4/2004 Nichols et al. ........ 370/395.62
6,724,825 B1 * 4/2004 Nemiroff et al. ...... 375/240.27
6,731,649 B1 * 5/2004 Silverman ................... 370/466
6,747,996 B1 * 6/2004 Holloway et al. .......... 370/503
6,819,682 B1 * 11/2004 Rabenko et al. ............ 370/503
2002/0034196 A1 * 3/2002 Tzannes ..................... 370/529

* cited by examiner

*Primary Examiner*—Ming Jung

(57) ABSTRACT

The present invention relates to a method for providing synthesized clock synchronization reference signals in an asynchronous packet based network. Specifically, the present invention pertains to a method of using a timing reference signal as a synchronization reference for a synthesized signal of the same frequency for the purpose of providing synchronous analog communications, such as Voice Over Internet Protocol (VoIP). More specifically, the invention transmits reference signals in Ethernet packets which are then used by recipient devices to synthesize timing signals for synchronization purposes.

35 Claims, 5 Drawing Sheets

METHOD FOR PROVIDING A NETWORK TIMING REFERENCE CLOCK IN ETHERNET-CONNECTED VOIP EQUIPMENT

FIELD OF THE INVENTION

The present invention relates to a method for providing a network timing clock reference signal in Ethernet-connected VoIP equipment.

BACKGROUND OF THE INVENTION

In modern circuit-switched telephone networks, colloquially known as Plan Old Telephone Service (POTS), voice Codecs (Coder/Decoder) and Subscriber line Interface Circuits (SLIC) are used to interface with phone handsets, as well as analog and facsimile devices. Typically, the Codecs and SLICs reside in line cards in a central exchange (CO) or a Private Branch Exchange (PBX), driving handsets in customer premises at some distance away. Currently, an 8 kHz National Timing Reference (NTR) is used to provide a synchronized clock reference to all Codecs in all line cards in COs and PBXs for reliable telephonic operation.

Special equipment is used at the CO to gather the atomic-clock-generated NTR information from reliable sources, such as the National Timing Bureau, and to distribute it to all line cards. If no NTR signal is provided to the line cards, sampling clocks in the Codecs in the transmit and receive devices go out of synchronization, eventually losing significant data over some period of time. As a consequence, voice quality degrades and there is no reliable facsimile (fax) or analog phone modem transmission.

An illustration of a POTS system is shown in Prior Art FIG. 1A. Telephone set 101 communicates by analog voice to CO 102 which contains Codec 120. The NTR signal received at the CO is used by Codec 120 as a timing reference to decode analog voice (or FAX or video) data for digital transmission over long distances 200 to receiving CO 103 where the information is decoded by Codec 121 and synchronized by reference to the NTR data gathered at the receiving. CO. It is then sent to receiving telephone set 104.

Because most analog data streams, such as voice and video, are real-time and continuous, the information transmitted is normally generated by the source device and received by the destination device at a synchronized fixed rate. If the source and destination clocking is not synchronized, meaning the devices are not running in synch to the same reference clock, there will be a loss of information as one side overruns and the other side under-runs.

To ensure reliable communication of analog data over digital networks, a single synchronous master clock source needs to be provided to prevent data corruption and data loss when receiving and transmitting.

For Voice Over Internet Protocol (VoIP) applications, including voice, fax, video and analog modem, analog data are re-packetized into IP packets and transmitted over the internet. The Codec devices and SLIC circuits used in the VoIP equipment, unlike POTS, no longer reside in the COs and PBXs, but reside at the Internet Service Provider (ISP) sites, as well as user premises, instead.

An illustration of a typical VoIP implementation is gained by reference to Prior Art FIG. 1B. Headset 101 is connected through computer 105 by Local Area Network (LAN) 106 to server 107. Server 107 is connected by modem to CO 102 which in turn connects via POTS to ISP 201. ISP 201 is connected via internet 100 to ISP 202 which connects to CO 103. CO 103 provides, via POTS in this illustration, access to server 110 by LAN 111 to receiving user's computer 112 and finally telephone handset 104. Though in this illustration NTR is available at both COs, it isn't available in either LAN, resulting in possible "de-synchronization". A more problematic situation exists when either or both LANs connect directly to the Internet with out employing an NTR-gathering CO. This is the situation illustrated in Prior art FIG. 1C, where LAN 106 and LAN 111 both connect directly to internet 100.

Many user sites are LAN-based, usually in some implementation of Ethernet. Ethernet does not normally carry a time reference signal. In fact, one advantage of the several Ethernet protocols is that they primarily support non-time-dependent communications, thus adapting to high and low density usage periods without apparent impact. Unfortunately, There is currently no convenient way to distribute NTR to VoIP Codecs in ISP and customer sites in Ethernet-connected networks without a large cost in bandwidth used. As a consequence, VoIP applications face big challenges in the distribution of NTR clock references to Codecs in customer premises equipment applications. Today, expensive fax relay and analog modem relays are common means to bypass this lack of the NTR provisions in VoIP applications.

Presently in the POTS environment, analog modem data or fax data are transmitted as analog data in the voice band, sometimes re-digitized for telephone system transmission and re-converted to analog at the receiving-end CO, and converted back to digital data at the receiving user's site. This scheme simplifies the telephone communication (Telco) equipment required, since there is no difference between actual voice data or analog and fax modem data as far as the phone network is concerned. However, it does result in conversion, coding, and decoding delays. As long as NTR is present in the network, though, reliable operation is guaranteed.

Fax and modem relays are schemes employed to overcome the potential loss of data in VoIP applications, primarily because of the lack of NTR provisions. In these schemes, fax or analog modem transmission is terminated at the VoIP equipment in the customer premise, relaying data received over the Internet to the customer's destined fax machine or analog modem. A significant amount of digital signal processing (DSP) is required both at the transmitting and receiving VoIP equipment for analog modem or fax relay implementation.

Any of the methods of providing VoIP without NTR are limited, and any method for providing NTR to network-based users is expensive, both in equipment costs and in Internet bandwidth usage. What is needed, therefore, is a method for providing a synchronization clock reference to Ethernet-based users that does not unnecessarily eat excessive bandwidth but does provide for high quality communication of time-dependent data.

SUMMARY OF THE INVENTION

The present invention relates to a method for providing synthesized clock synchronization reference signals in an asynchronous packet based network. Specifically, the present invention pertains to a method of using a timing reference signal as a synchronization reference for a synthesized signal of the same frequency for the purpose of providing synchronous analog communications, such as Voice Over Internet Protocol (VoIP). More specifically, the invention transmits timing reference signals in Ethernet packets which are then used by recipient devices to synthesize timing signals for synchronization purposes.

One embodiment of the present invention includes a method for providing a timing reference signal in a network by using the steps of receiving a National Timing Reference signal at a source device, representing the National Timing Reference signal with data that can be transmitted in a network, transmitting that data asynchronously in a packet-based network to a target device and generating a synthesized timing reference signal at the target device that is synchronized to the National Timing Reference signal.

BRIEF DESCRIPTION OF THE DRAWINGS

The operation of this invention can be best visualized by reference to the drawings.

DETAILED DESCRIPTION

Figure 1A:
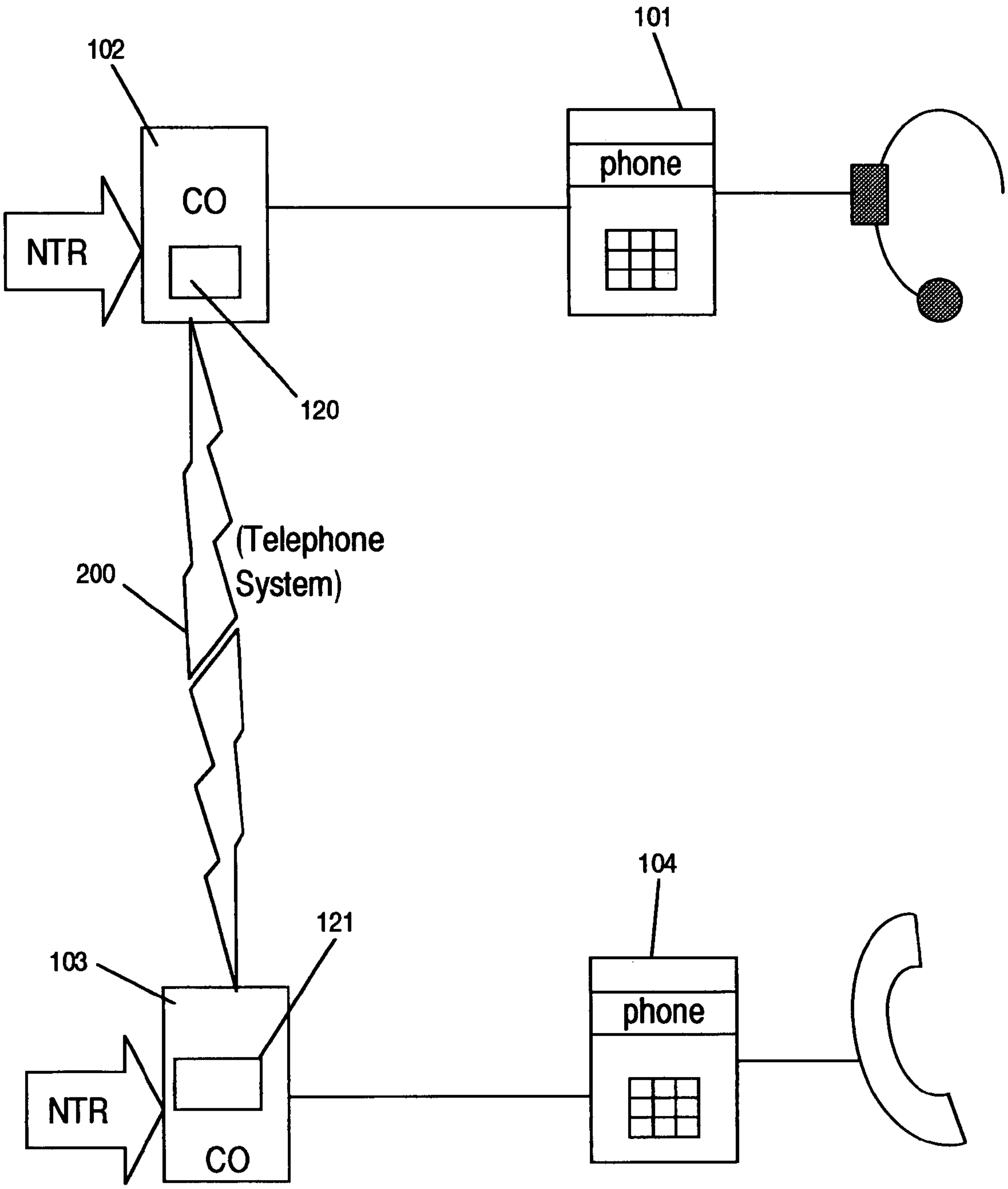
FIG. 1A (Prior Art) illustrates a typical implementation of POTS (Plain Old Telephone Service).
Figure 1B:
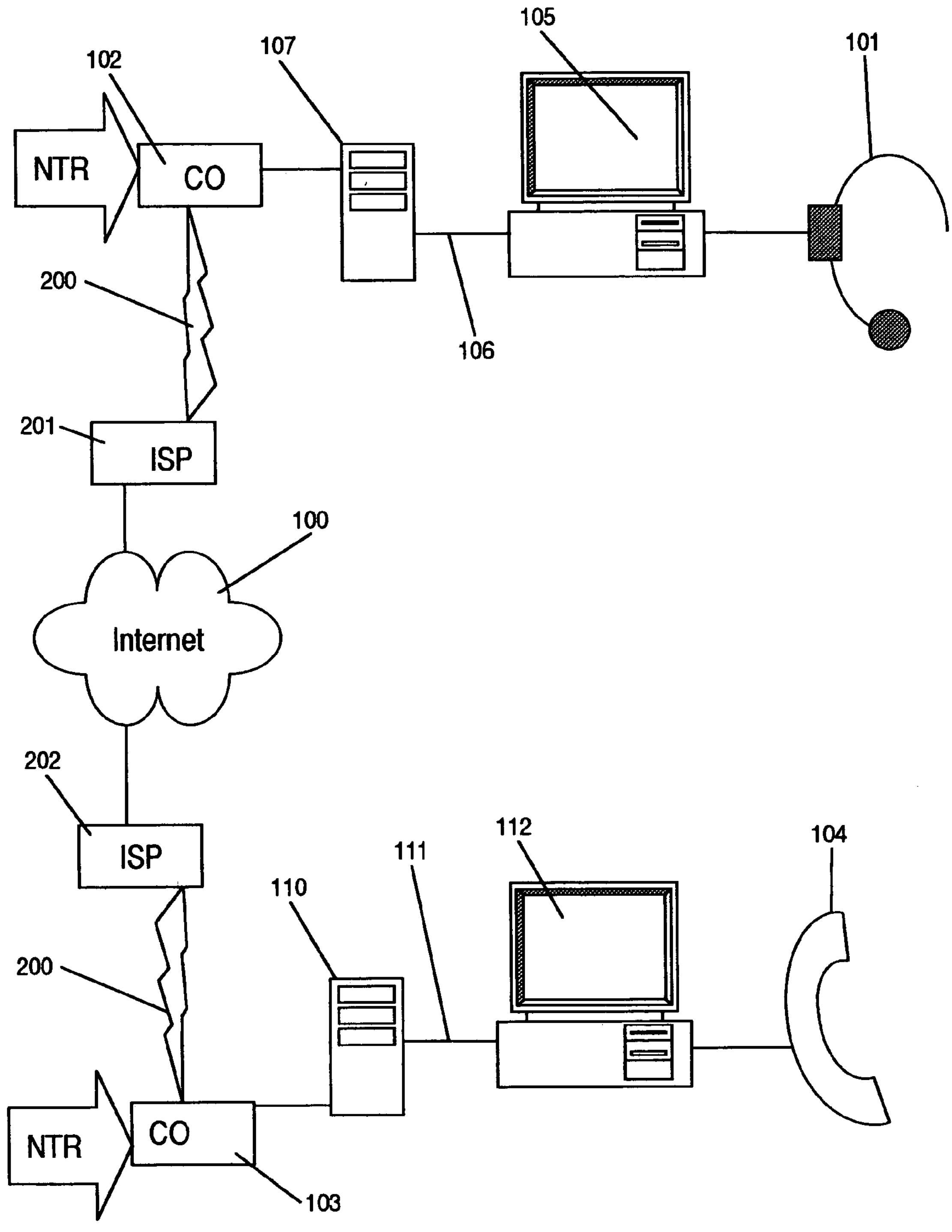
FIG. 1B (Prior Art) illustrates a typical VoIP (Voice Over Internet Protocol) implementation.
Figure 1C:
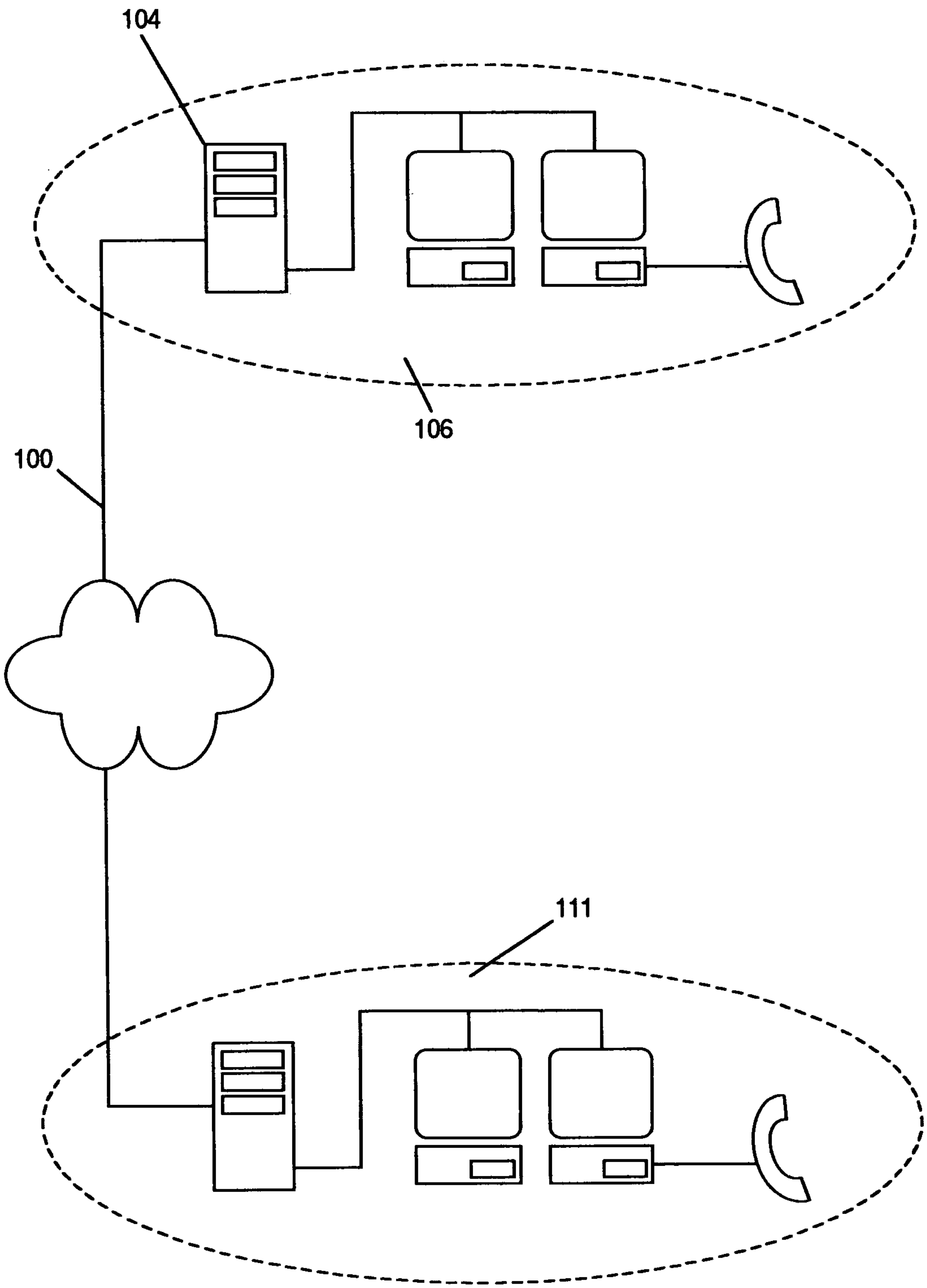
FIG. 1C (Prior Art) illustrates a typical LAN/Internet/LAN VoIP environment in accordance with one embodiment of the present invention.

In the following description of the present invention, numerous specific details are set forth in order to provide a thorough understanding of the present invention. However, it will be recognized by one skilled in the art that the present invention may be practiced without these specific details or with equivalents thereof. In other instances, well-known structures and devices are shown in block diagram form in order to avoid obscuring the present invention.

Described herein is a new method for inserting and maintaining a clock timing reference in network-connected, Voice-Over-Internet-Protocol (VoIP), equipment. In the embodiment of the present invention described here, the shortcomings of the lack of a clock timing reference provision in network, typically Ethernet, connected VoIP equipment are eliminated and corrected. Furthermore, this embodiment overcomes the expense and technical concessions of the more common means of implementing VoIP operations in networks that operate without a timing reference.

In this embodiment, periodic synchronizing pulses are incorporated in the Ethernet link that connects the VoIP equipment. At the transmitting end, National Timing Reference (NTR) signals are obtained, either directly from the National Timing Reference Bureau, or indirectly from equipment that has access to this reference, such as a cable modem or DSL modem. This timing reference information is then converted into an Ethernet link layer clock synchronization packet. The Ethernet link layer synchronization packet is then transmitted down the Ethernet link to the receiving end. The receiving end extracts the timing reference from the clock synchronization packet. The receiving end then uses the information to feed a phase-locked loop (PLL) circuit which generates a recovered clock to lock the receiving Codec to the NTR. The receiving end is capable of propagating the NTR information to another Internet device further downstream in a similar manner.

For VoIP applications, clock synchronization is only required to cover periods of time longer than some known minimum. Short term clock variations are typically tolerated because of jitter buffers inserted in the receiver. These jitter buffers are inserted primarily to cover the "bursty" nature of network traffic, the tendency for packets to arrive at the receiving end in groups, or bursts. The need for NTR thus requires that clock synchronization be sent only on an as-needed basis, generally meaning on longer time intervals than the jitter buffers allow. This minimizes the overhead in link bandwidth consumption.

To achieve this saving, this embodiment of the present invention uses the following method. When the Ethernet link is established between VoIP equipment, the transmit and receive codes are running at maximum clock difference (out of synchronization). The receive PLL error voltage clock will be at maximum, This information is then sent back to the transmitter, requesting it to send the clock synchronization packets at the quickest rate possible. When the receiver is in synchronization with the transmitter, the PLL error voltage will be minimum. This information is also fed back to the transmit side, requesting it to send the clock synchronization packets at the slowest rate possible. This results, generally, in an absolute minimum of bandwidth being devoted to the clock reference and leaving the remainder of the valuable bandwidth for communication.

Figure 2:
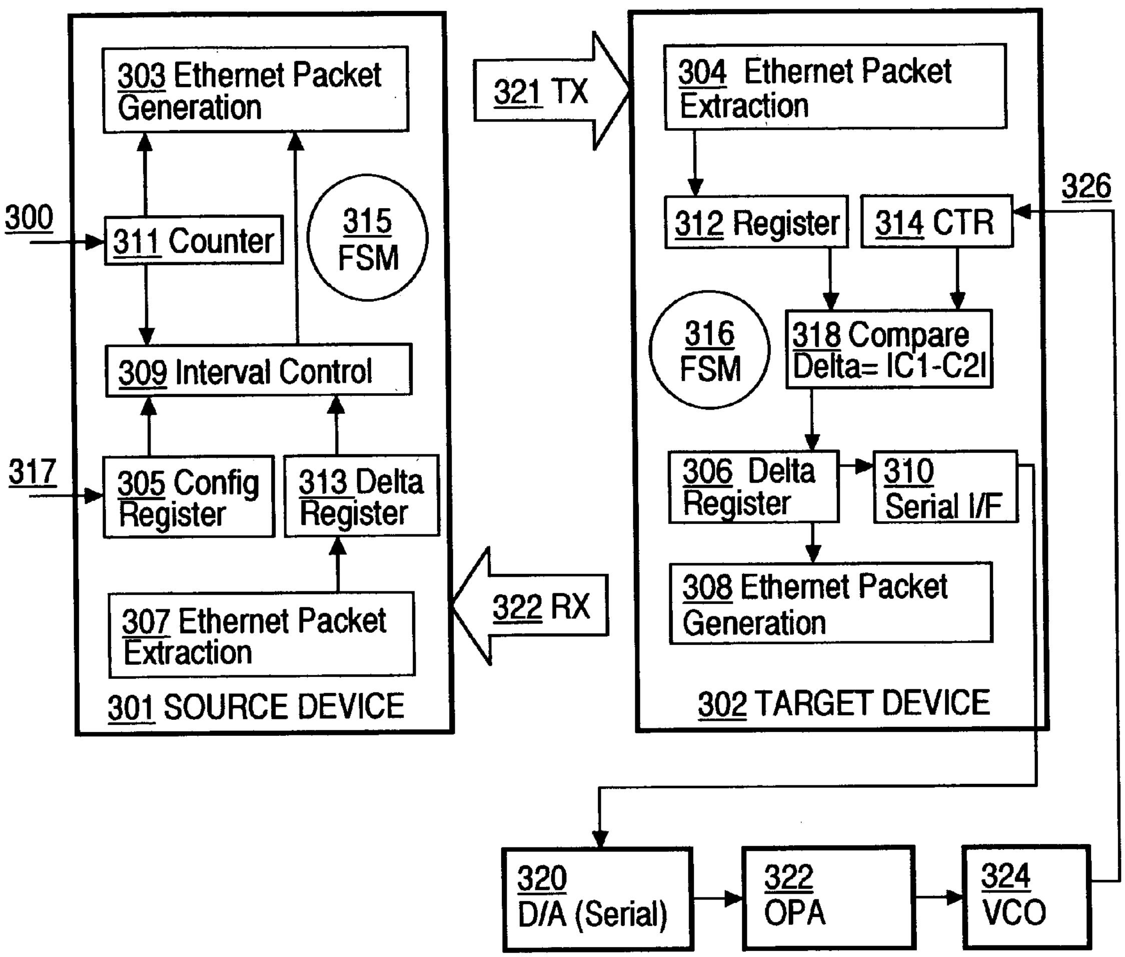
FIG. 2 is a block diagram illustrating an embodiment of the present invention.

One embodiment of the present invention can be more clearly illustrated by reference to FIG. 2 where, in this embodiment, Source Device 301 and Target Device 302 are envisioned as work stations or LAN servers though they may be implemented in other fashions in other embodiments. Source Device 301 receives a 2.048 MHz NTR signal, 300, from one of the recognized sources, usually through the CO or the service provider. The reference signal is continuously counted on Counter 311, a twelve bit counter in this implementation but suitable to other devices as well, which sends the count value to Ethernet Packet Generation Block 303. The count value is inserted in an Ethernet Synchronization Packet and transmitted 321 to target device 302 at an interval specified by Interval control. Block 309. Note that, in this implementation with a twelve bit counter, the maximum selectable interval is 2 ms. In other embodiments, since the maximum selectable interval is based on the counter's bit count, longer intervals could be selected with larger counters.

The count value transmission interval can be pre-determined by Finite State Machine 315 using software 317 which stores an interval selection value in register 305. This interval can be changed by a value stored in register 313, as will be seen further on.

The Ethernet Synchronization Packet transmitted is received at Target Device 302 and the NTR count value is extracted in Ethernet Packet Extraction Block 304 and stored in register 312. The value is compared in comparison block 318 with the value stored in register 314 and the difference, or Delta Value, is stored in Delta Register 306. The Delta Value is sent both to Ethernet Packet Generation Block 308 and to block 310. Block 310 is, in this embodiment, a serial interface but other embodiments may use other interface protocols.

Two uses are made of the Delta Value. From serial interface 310, the Delta Value is sent to D/A converter 320 and converted to an analog signal which is amplified by Amplifier 322. The amplified signal adjusts the output frequency of Voltage Controlled Oscillator 324. VCO 324 has a nominal output frequency of 2.048 MHz, though in other embodiments some other predefined frequency may be used, the same as the NTR frequency, which means that VCO 324 is used to generate a pseudo NTR frequency.

In other embodiments of the present invention, the signal generated at the target device may be generated by any number of methods. The VCO method chosen here is merely for illumination of the present invention. Another embodiment could also gererate and control the signal entirely in the digital domain, using the delta value to control a frequency synthesizer.

With adjustment by reference to the actual NTR signal, the pseudo NTR reference becomes a "recovered" NTR signal. The requisite adjustment is made by the signal from the difference measurement, the Delta Value, generated back at comparison block 318. To implement the comparison, the output frequency of VCO 324 is fed to counter 314, which is likely to be the same size as counter 311 in Source Device 301. The output value from counter 314 is compared in comparison block 318 with the output value from counter 311 which is transmitted in Ethernet Synchronization Packets as shown above.

While the comparison shown here results in a "recovered" NTR signal, a further set of steps is required in order to achieve a reduction in bandwidth usage. Where the Delta Value stored in delta register 306, in addition to being sent to interface 310, is also sent to Ethernet Packet Generation Block 308. There the Delta Value is inserted in an Ethernet Synchronization Packet and sent back, 322, to Source Device 301 at a rate determined by Delta Value itself. It is envisioned that other embodiments may use other rate controlling values, such as the rate of reception of the Ethernet Synchronization Packet transmission to Target Device 302 from Source Device 301.

When the Ethernet Synchronization Packet sent to Source Device 301 is received, the Delta Value is extracted in Ethernet Packet Extraction Block 307. From there it is stored in Delta Register 313 from which it is sent to Interval Control Block 309. At interval control Block 309, the Delta Value is used to adjust the stored value that controls interval selection for Ethernet Synchronization Packet generation at generation block 303.

Using this feedback technique, the difference between the actual NTR signal at the Source Device and the recovered NTR signal at the Target Device is what determines the rate of Ethernet Synchronization Packet transmission. When the difference between the signals is maximum, the rate of Ethernet Synchronization Packet transmission is also maximum, resulting in the most expeditious correction of the recovered NTR. When the difference between the signals in minimum, meaning the recovered NTR is the same as the NTR, the rate of Ethernet Synchronization Packet transmission is minimum, resulting in a minimum of bandwidth usage for synchronization. Thus, synchronization for analog data sent via the Internet is held at an optimal maximum and the cost of such synchronization is held to an optimal minimum.

Figure 3:
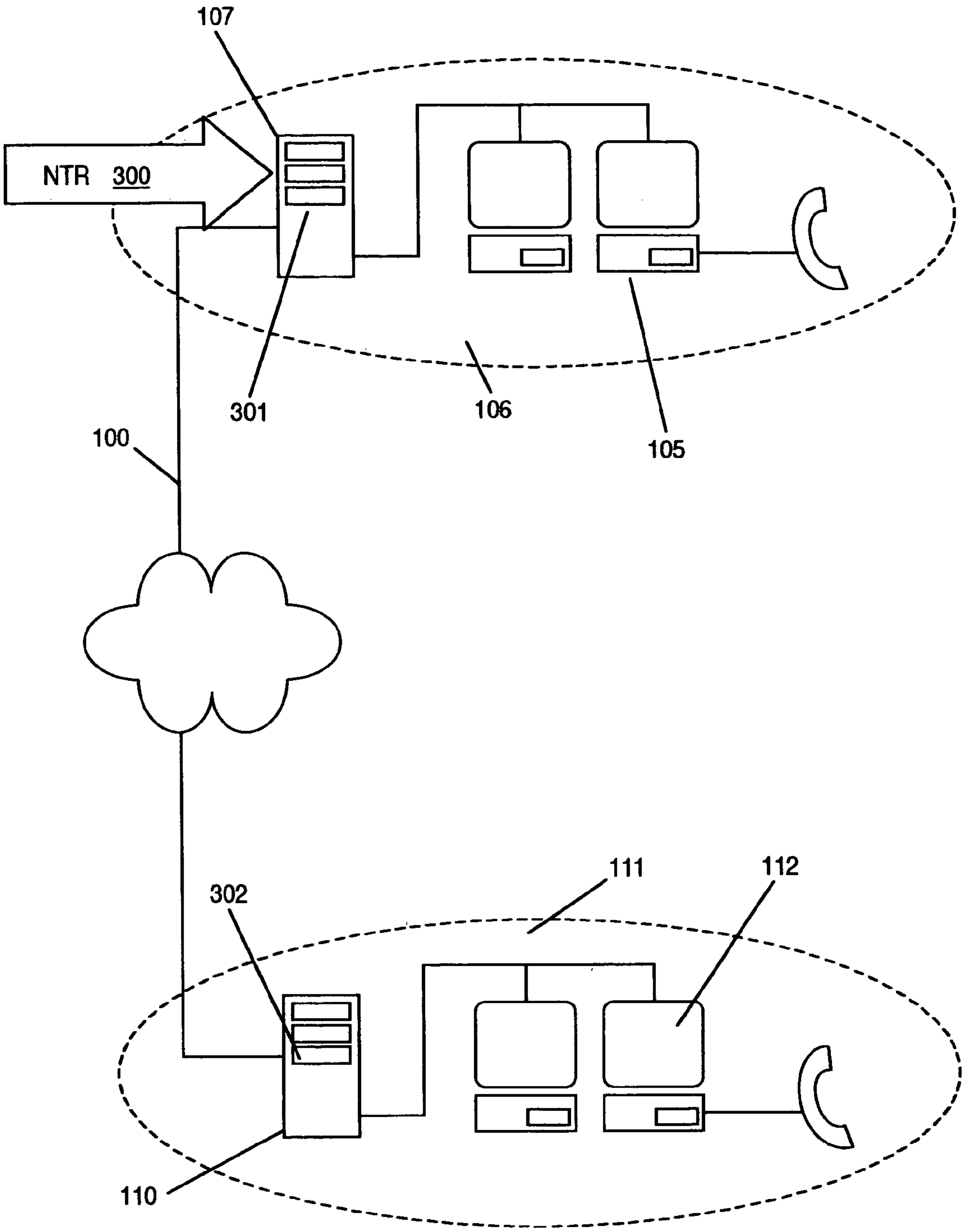
FIG. 3 illustrates an Ethernet implemented network in accordance with the present invention.

An implementation of this embodiment of the present invention is illustrated in FIG. 3. Source device 301 is located, in this embodiment, in server 107 which is part of LAN 106. Source device acquires NTR signal 300 and encodes and transmits it as outlined above. The network packet containing data representing the NTR signal is transmitted via internet 100 to target device 302, located in this illustration, in server 110, in LAN 111. Signal synthesis and synchronization, outlined above, is accomplished in target device 302. The timing reference, required for VoIP communication between user 105 and user 112, is thus available with minimum impact on bandwidth usage in either LAN or internet.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for providing a timing reference signal in a network, comprising the steps of:

a) receiving a timing signal at a source device;

b) representing said timing signal as data capable of transmission in a network;

c) transmitting said data representing said received timing signal in an asynchronous packet-based network from said source device;

d) receiving a network packet containing data representing said timing signal at a target device; and, e) producing a synthesized timing reference signal, said synthesized timing reference signal being synchronized with said timing signal received at said source device by reference to said transmitted data at said target device.

2. The method described in claim 1, wherein at least a portion of said network is implemented as an Ethernet.

3. The method described in claim 1, wherein said received timing reference signal is a National Timing Standard Reference signal.

4. The method described in claim 1, wherein a data format of said data comprises a numerical value.

5. The method described in claim 4, wherein said numerical value is generated by a frequency counter.

6. The method described in claim 1, wherein said transmission of said network packet is accomplished at a controllable interval.

7. The method described in claim 6, wherein said controllable interval is capable of being controlled by data received back from said target device.

8. A method for synthesizing and synchronizing a timing reference signal in a network, comprising the steps of:

a) generating a constant-frequency signal at a target device;

b) generating data representing said constant frequency signal;

c) receiving a network packet containing data representing a timing reference signal at said target device from a source device that receives said timing reference signal;

d) extracting said data representing said timing reference signal from said network packet;

e) comparing said data representing said timing reference signal with said data representing said constant frequency signal; and, f) adjusting said constant frequency signal based on said comparison of said timing reference signal and said constant frequency signal.

9. The method described in claim 8, wherein said timing reference signal is a National Timing Reference signal.

10. The method described in claim 8, wherein said timing reference signal is a constant 2.048 MHz.

11. The method described in claim 8, wherein said constant frequency signal is generated at 2.048 MHz.

12. The method described in claim 8, wherein said constant frequency signal is generated by a voltage controlled oscillator.

13. The method described in claim 8, wherein said comparison of said constant frequency signal and said timing reference signal results in an analog voltage.

14. The method described in claim 13, wherein said analog voltage is analogous to the difference between said constant frequency signal and said National Timing Reference signal.

15. The method described in claim 13 wherein said analog voltage is used as the basis for adjusting the output frequency of said voltage controlled oscillator.

16. A method for minimizing bandwidth used in providing timing reference signals in a network, comprising the steps of:

a) receiving a timing reference signal at a source device;

b) transmitting data representing said received timing reference signal to a target device;

c) synthesizing a timing signal at said target device wherein said synthesized timing signal is synchronized with said received timing reference signal; and, d) adjusting the rate of transmission of said data representing said timing reference signal by reference to a comparison of said timing reference signal and said synchronized, synthesized, timing signal.

17. The method described in claim 16, wherein said timing reference signal received at said source device is represented by numerical data.

18. The method described in claim 16, wherein said data representing said timing reference signal is inserted in an asynchronous network packet.

19. The method described in claim 16, wherein said synchronized, synthesized, timing signal generated at said target device is represented by numerical data.

20. The method described in claim 16, wherein said data representing said timing reference signal is compared with said data representing said synchronized, synthesized, timing signal generated at said target device for the purpose of determining the difference between said signals.

21. The method described in claim 20, wherein said difference is represented by numerical data.

22. The method described in claim 20, wherein said difference is a phase difference.

23. The method described in claim 20, wherein said difference is used as a basis for optimizing the rate of transmission of said data representing said timing reference signal from said source device to said target device.

24. A source device for transmitting data representing a received timing reference signal, comprising:

an element for receiving a timing reference signal;

an element for generating data representing said timing reference signal;

an element for generating an asynchronous network communication packet containing said data representing said timing reference signal;

an element for transmitting said asynchronous network communication packet;

an element for controlling the rate of transmission of said asynchronous network communication packet; and, an element for extracting data from other asynchronous network communication packets.

25. The source device described in claim 24, wherein said asynchronous network communication packet is implemented as an Ethernet packet.

26. A target device for receiving data representing a timing reference signal and for synchronizing a synthesized timing reference signal to said timing reference signal, comprising:

an element for receiving an asynchronous network communication packet;

an element for extracting said data representing said timing reference signal from said asynchronous network communication packet wherein said timing reference signal is received by a source device;

an element for generating a constant frequency signal capable of adjustment;

an element for generating data representing said constant frequency signal;

an element for comparing said data representing said timing reference signal with data representing said constant frequency signal; and, an element capable of adjusting the output frequency of said constant frequency signal generating element.

27. The target device described in claim 26, wherein said asynchronous network communication packet is implemented as an Ethernet packet.

28. The target device described in claim 26, wherein said element for generating said constant frequency signal is implemented as a voltage controlled oscillator.

29. The target device described in claim 26, wherein said element for comparing said data representing said timing reference signal with data representing said constant frequency signal is adapted to produce an analog voltage representing the difference between said timing reference signal and said constant frequency signal.

30. An apparatus for minimizing bandwidth used in providing timing reference signals in a network, comprising:

a source device for generating and transmitting asynchronous network communication packets containing data representing a timing reference signal:

a target device for generating a synchronized, synthesized, constant frequency signal; and, a network for coupling said source device and said target device, wherein said timing reference signal is a National Timing Reference signal.

31. The apparatus described in claim 30, wherein said source device comprises an element capable of adjusting the rate of transmission of said asynchronous network communication packets.

32. The apparatus described in claim 31, wherein said element capable of adjusting said rate of transmission is further capable of optimizing said rate of transmission by reference to data representing the difference between said timing reference signal and said synchronized, synthesized, constant frequency signal.

33. The apparatus described in claim 30, wherein said target device comprises an element capable of transmitting asynchronous network communication packets containing data representing the difference between said timing reference signal and said synchronized, synthesized, constant frequency signal.

34. A computer-readable medium having stored thereon instructions for performing a method for providing a timing reference signal in a network, comprising the steps of:

a) receiving a timing signal at a source device;

b) representing said timing signal as data capable of transmission in a network;

c) transmitting said data representing said received timing signal in an asynchronous packet-based network from said source device;

d) receiving a network packet containing data representing said timing signal at a target device; and, e) producing a synthesized timing reference signal, said synthesized timing reference signal being synchronized with said timing signal received at said source device by reference to said transmitted data at said target device.

35. A computer-readable medium having stored thereon instructions for performing a method for minimizing bandwidth used in providing timing reference signals in a network, comprising the steps of:

a) receiving a timing reference signal at a source device;

b) transmitting data representing said received timing reference signal to a target device;

c) synthesizing a timing signal at said target device wherein said synthesized timing signal is synchronized with said received timing reference signal; and, d) adjusting the rate of transmission of said data representing said timing reference signal by reference to a comparison of said timing reference signal and said synchronized, synthesized, timing signal.

* * * * *